(12) United States Patent
Desai et al.

(10) Patent No.: US 11,333,183 B2
(45) Date of Patent: May 17, 2022

(54) SEALANT POD SELF-SECURING INSERT

(71) Applicant: The Boeing Company, Chicago, IL (US)

(72) Inventors: Raj A. Desai, Seattle, WA (US); Christopher Brad Long, Charleston, SC (US); Christopher J. Mills, Charleston, SC (US)

(73) Assignee: The Boeing Company, Chicago, IL (US)

( * ) Notice: Subject to any disclaimer, the term of this patent is extended or adjusted under 35 U.S.C. 154(b) by 186 days.

(21) Appl. No.: 16/718,671

(22) Filed: Dec. 18, 2019

(65) Prior Publication Data

US 2021/0190111 A1 Jun. 24, 2021

(51) Int. Cl.
*F16B 11/00* (2006.01)
*F16B 5/01* (2006.01)
*F16B 13/14* (2006.01)
*B32B 37/14* (2006.01)

(52) U.S. Cl.
CPC .............. *F16B 11/006* (2013.01); *F16B 5/01* (2013.01); *B32B 37/142* (2013.01); *F16B 13/141* (2013.01)

(58) Field of Classification Search
CPC ........ F16B 5/01; F16B 11/006; F16B 13/141; F16B 37/048; B29C 66/72525; B29C 66/7254; B32B 37/142
See application file for complete search history.

(56) References Cited

U.S. PATENT DOCUMENTS 4,425,065 A * 1/1984 Sweeney ............... F16B 13/143
156/92

\* cited by examiner

*Primary Examiner* — Carson Gross
(74) *Attorney, Agent, or Firm* — Womble Bond Dickinson (US) LLP

(57) ABSTRACT

A fastener-receiving insert system includes a fastener-receiving insert having a proximal end and a distal end and at least one adhesive-dispensing chamber adjacent to the distal end of the insert, containing at least one part of an adhesive material within a chamber wall. The fastener-receiving insert system further includes a puncturing device operably engaged with and configured to puncture the chamber wall to release the at least one part of the adhesive material around the fastener-receiving insert.

20 Claims, 9 Drawing Sheets

SEALANT POD SELF-SECURING INSERT

BACKGROUND

Field of the Disclosure

The present disclosure relates to a method and system for a fastener-receiving insert system for use with a composite panel.

Description of Related Art

Composite panels, such as honeycomb-cored sheets, often cannot have mechanical fasteners directly affixed thereto. In some instances, if such a composite panel requires a mechanical fastener to be affixed thereto, a fastener-receiving insert can first be installed in and secured to the composite panel, and the mechanical fastener then engaged with the insert. In this manner, the mechanical fastener can be used with the installed insert to secure the composite panel to other structures.

Figure 1A:
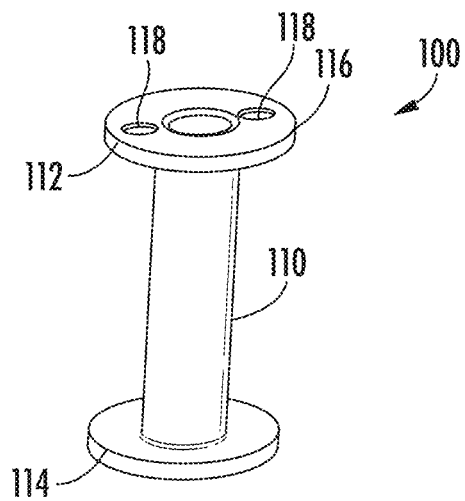
Figure 1B:
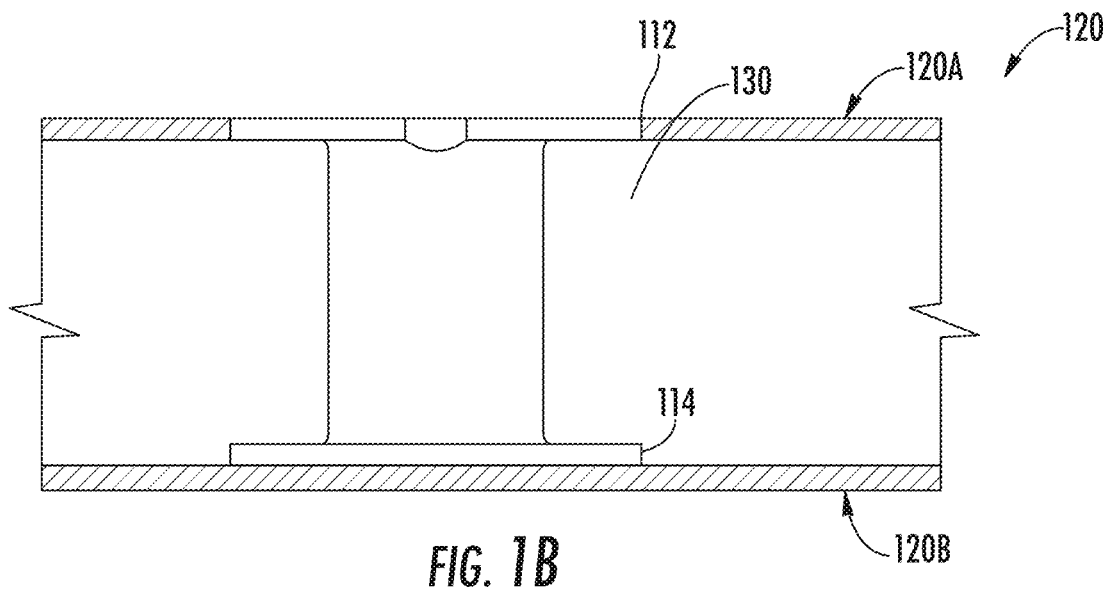

Such fastener-receiving inserts are typically installed in insert-receiving orifices in the composite panels. The inserts are generally installed so as to be as close to flush or coplanar with the outer surface of the composite panel as possible, in order to provide optimal interaction with the mechanical fastener and the other structures, and structural integrity of the assembled end product. Such inserts are often installed in composite panels using adhesive material (e.g., a special purpose two-part potting compound) in a multi-step process. FIGS. 1A and 1B illustrate a prior art example installation of a fastener-receiving insert 100 in an insert-receiving orifice 130 in a composite panel 120. The fastener-receiving insert 100 has a body portion 110, a proximal or engagement end 112, a distal or retention end 114, an engagement surface 116, and a plurality of adhesive application orifices 118. When installed in the insert-receiving orifice 130 of the composite panel 120, the fastener-receiving insert 100 must typically be disposed such that the engagement surface 116 is as close to flush with the one of the major surfaces or face sheets 120A, 120B of the composite panel 120, as possible. Once the fastener-receiving insert 100 is inserted into the insert-receiving orifice 130, an adhesive preparation module or kit including the two-part potting compound is actuated such that the two parts are mixed and introduced into the adhesive application orifices 118. The fastener-receiving insert 100 is held in position inside the insert-receiving orifice 130 during introduction of the adhesive material. The actuated adhesive material typically has to be applied within a short period of time as the actuated adhesive materials typically have a fast curing time. As such, the adhesive material is dispensed into the adhesive application orifices soon after introduction of the fastener-receiving insert 100 in the insert-receiving orifice 130 and before the lapse of the adhesive application time. There is potential for wastage of adhesive material, rework or scrapping of the honeycomb composite panel, if the adhesive material is not dispensed into and cured within the adhesive application orifice within the adhesive application time. In addition, in order to get complete coverage of the adhesive, the actuated adhesive material may need to be applied to two sides of the face of the insert. The actuated adhesive material may also be applied in excess of what is required for adequate bondage to ensure a sufficient bond. The excess may then need to be mechanically wiped off.

Thus, there is a need for a fastener-receiving insert and method for installing the same in a composite panel that reduces installation time, reduces equipment requirement, reduces labor, is easily automated and minimizes wastage of adhesive materials.

SUMMARY

The above and other needs are met by aspects of the present disclosure which, in one aspect, provides a fastener-receiving insert system. The fastener-receiving insert system includes a fastener-receiving insert having a proximal end and a distal end and at least one adhesive-dispensing chamber adjacent to the distal end of the insert. The at least one adhesive-dispensing chamber contains at least one part of an adhesive material within a chamber wall. The fastener-receiving insert system further includes a puncturing device operably engaged with and configured to puncture the chamber wall to release the at least one part of the adhesive material around the fastener-receiving insert.

Another aspect of the disclosure provides a method of forming a fastener-receiving insert system. The step of forming the fastener-receiving insert system includes disposing at least one adhesive-dispensing chamber adjacent to a distal end of a fastener-receiving insert having a proximal end and a distal end, and the at least one adhesive-dispensing chamber containing at least one part of an adhesive material within a chamber wall. The step of forming the fastener-receiving insert system further includes operably-engaging a puncturing device with the at least one adhesive-dispensing chamber, the puncturing device being configured to puncture the chamber wall to release the at least one part of the adhesive material around the fastener-receiving insert.

Another aspect of the disclosure provides installing a fastener-receiving insert system in a composite panel. The step of installing the fastener-receiving insert system in the composite panel includes placing a fastener-receiving insert system in an insert-receiving orifice defined by the composite panel, the fastener-receiving insert system comprising a fastener-receiving insert having a proximal end and a distal end, at least one adhesive-dispensing chamber adjacent to the distal end of the fastener-receiving insert, and containing at least one part of an adhesive material within a chamber wall, and a puncturing device operably engaged with the chamber wall. The step of installing the fastener-receiving insert system in the composite panel further includes applying pressure to the proximal end of the fastener-receiving insert in the insert-receiving orifice to compress the at least one adhesive-dispensing chamber. The step of installing the fastener-receiving insert system in the composite panel further includes puncturing the chamber wall with the puncturing device to release the at least one part of the adhesive material therefrom and to dispense the at least one part of the adhesive material between the fastener-receiving insert and the composite panel to secure the fastener-receiving insert within the insert-receiving orifice.

These and other features, aspects, and advantages of the present disclosure will be apparent from a reading of the following detailed description together with the accompanying drawings, which are briefly described below. The present disclosure includes any combination of two, three, four, or more features or elements set forth in this disclosure, regardless of whether such features or elements are expressly combined or otherwise recited in a specific embodiment description herein. This disclosure is intended to be read holistically such that any separable features or elements of the disclosure, in any of its aspects and embodiments, should be viewed as intended, namely to be combinable, unless the context of the disclosure clearly dictates otherwise.

It will be appreciated that the summary herein is provided merely for purposes of summarizing some example aspects so as to provide a basic understanding of the disclosure. As such, it will be appreciated that the above described example aspects are merely examples and should not be construed to narrow the scope or spirit of the disclosure in any way. It will be appreciated that the scope of the disclosure encompasses many potential aspects, some of which will be further described below, in addition to those herein summarized. Further, other aspects and advantages of such aspects disclosed herein will become apparent from the following detailed description taken in conjunction with the accompanying drawings which illustrate, by way of example, the principles of the described aspects.

BRIEF DESCRIPTION OF THE SEVERAL VIEWS OF THE DRAWING(S)

Figure 2A:
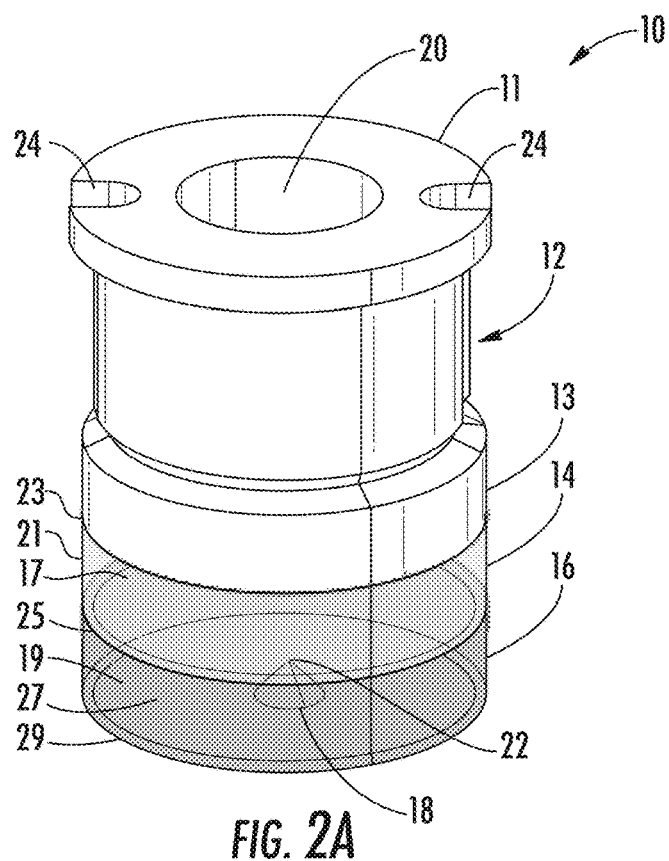
Figure 2B:
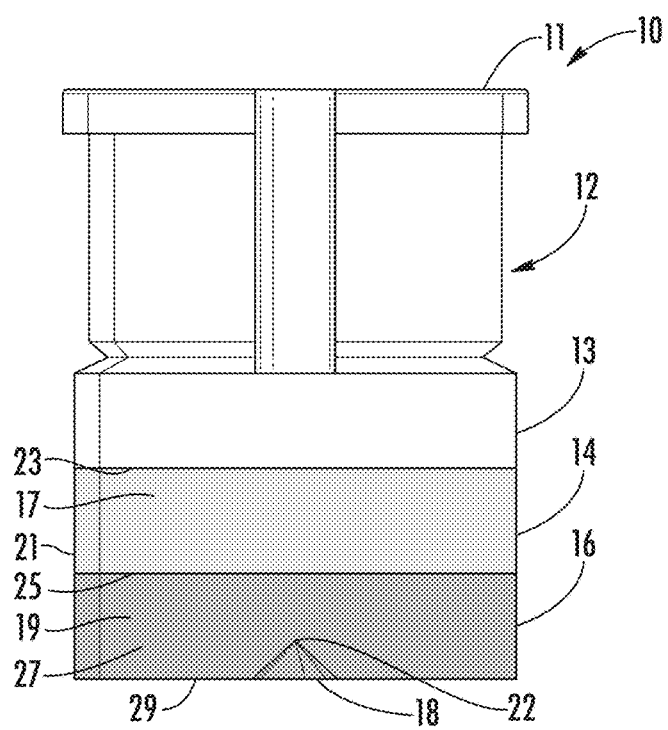
Figure 3:
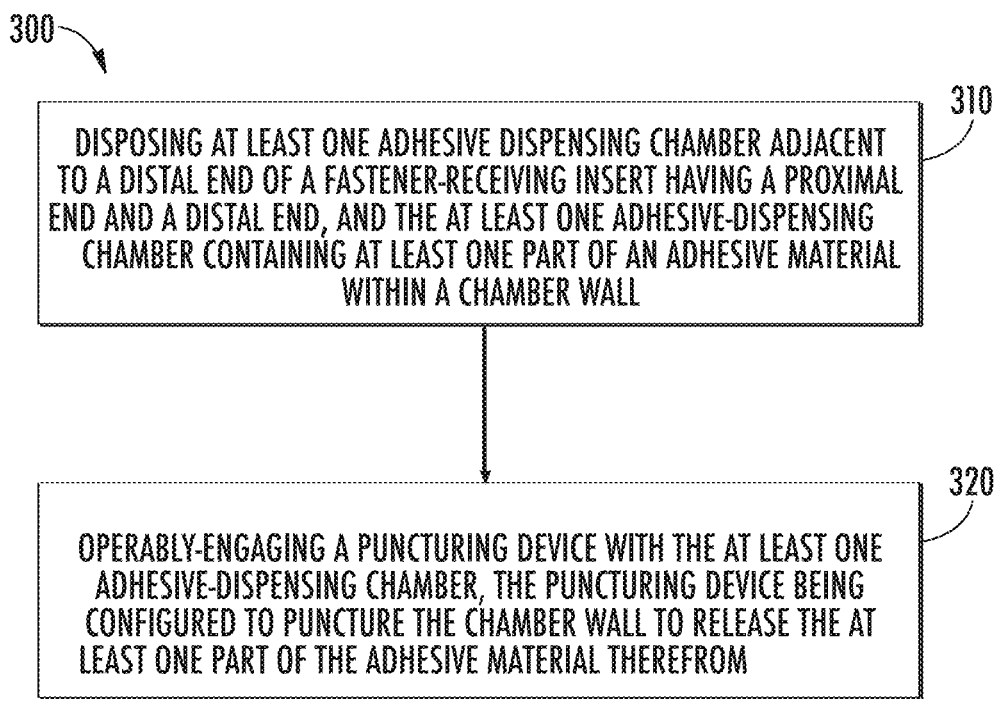
Figure 4A:
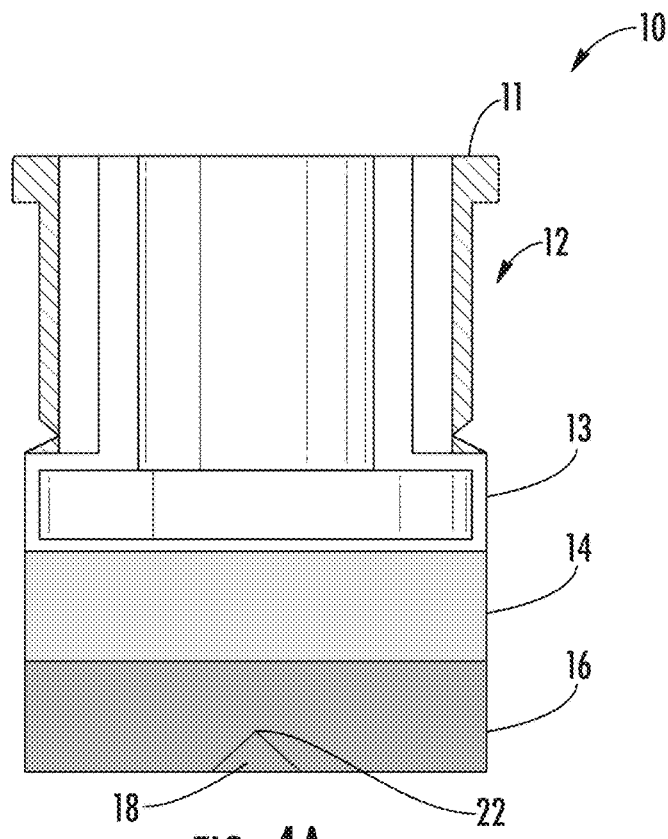
Figure 4B:
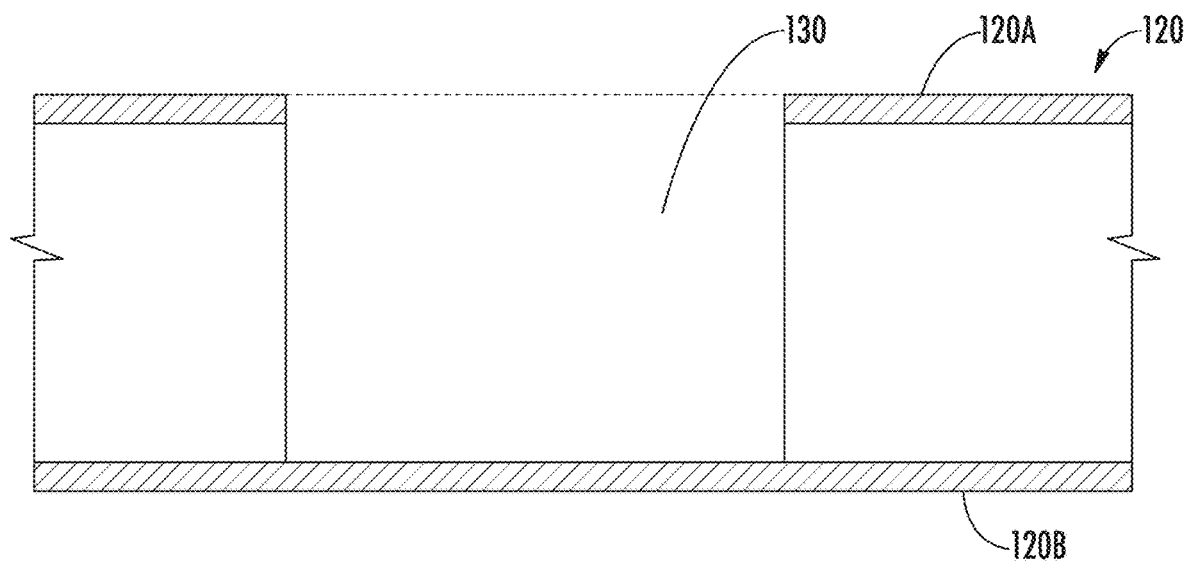
Figure 9:
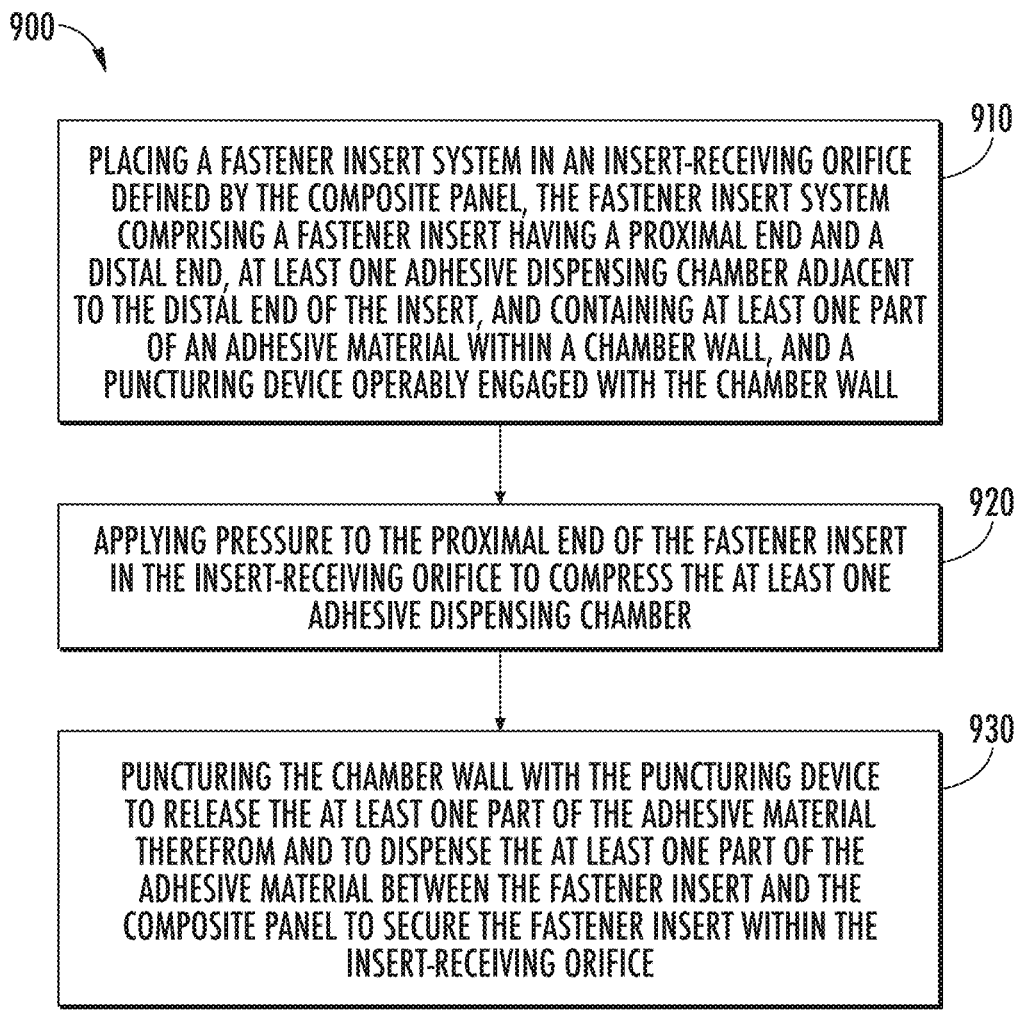

Having thus described the disclosure in general terms, reference will now be made to the accompanying drawings, which are not necessarily drawn to scale, and wherein:

FIGS. 1A and 1B schematically illustrate a typical fastener-receiving insert installed in an insert receiving orifice using a traditional method;

FIGS. 2A and 2B schematically illustrate an example configuration of a fastener-receiving insert, according to one aspect of the present disclosure;

FIG. 3 is a flowchart of an example process of forming the fastener-receiving insert, according to one aspect of the present disclosure;

FIGS. 4A and 4B schematically illustrate a fastener-receiving insert in conjunction with an insert-receiving orifice of a composite panel, according to an embodiment of the present disclosure; and FIGS. 5-8 schematically illustrate an example process of installing the fastener-receiving insert in the insert-receiving orifice, according to one aspect of the present disclosure;

FIG. 9 is a flowchart of an example process of installing the fastener-receiving insert in the insert-receiving orifice, according to one aspect of the present disclosure;

DETAILED DESCRIPTION OF THE DISCLOSURE

The present disclosure now will be described more fully hereinafter with reference to the accompanying drawings, in which some, but not all aspects of the disclosure are shown. Indeed, the disclosure may be embodied in many different forms and should not be construed as limited to the aspects set forth herein; rather, these aspects are provided so that this disclosure will be thorough and complete, will fully convey the scope of the disclosure to those skilled in the art, and will satisfy applicable legal requirements. Like numbers refer to like elements throughout. As used in this specification and the claims, the singular forms "a," "an," and "the" include plural referents unless the context clearly dictates otherwise.

FIGS. 2A-2B schematically illustrate a fastener-receiving insert system 10, which in one example, is particularly applicable to composite panels, such as a honeycomb-cored sheet. An example of such a composite panel is the composite panel 120 of FIG. 1B. In various embodiments, the composite panel 120 forms a portion of an aircraft wing, a portion of an aircraft nacelle, a portion of an aircraft fuselage, a portion of an aircraft empennage, a portion of the aircraft interior, or a portion of another aircraft structure. FIG. 2A is a perspective view of the fastener-receiving insert system 10 and FIG. 2B is a cross-sectional side view of the fastener-receiving insert system 10. The fastener-receiving insert system 10 includes a fastener-receiving insert 12 having a proximal end 11 and a distal end 13. The fastener-receiving insert 12 is adapted to be received in an insert-receiving orifice 130 (see, e.g., FIGS. 3B and 4-7) defined by the composite panel 120. The fastener-receiving insert system 10 includes an opening 20 to receive a mechanical fastener (not shown). The fastener-receiving insert system 10 further includes at least one adhesive-dispensing chamber adjacent to the distal end 13 of the fastener-receiving insert 12. The at least one adhesive-dispensing chamber contains at least one part of an adhesive material within a chamber wall. In one embodiment, the fastener-receiving insert system 10 has a single adhesive-dispensing chamber containing the adhesive material therein. In another embodiment (e.g., illustrated in FIGS. 2A-7), the fastener-receiving insert system 10 includes two adhesive-dispensing chambers 14, 16, with one chamber containing a first part 17 and the other chamber containing a second part 19 of a two-part adhesive material. The two parts 17, 19 of the adhesive material form a two-part potting compound that, when mixed with each other, form an actuated adhesive material for securing the fastener-receiving insert 12 within the insert-receiving orifice 130. In one embodiment, the adhesive material comprises a 2-part epoxy system.

Referring again to FIG. 2A-2B, the two adhesive-dispensing chambers 14, 16 respectively containing one of the two parts 17, 19 of the adhesive material, in one embodiment, include chamber walls 21, 23, 25, 27, and 29 cooperating to define the two adhesive-dispensing chambers 14, 16. The adhesive-dispensing chamber 14 includes a side (circumferential) chamber wall 21 and a top chamber wall 23. A common chamber wall 25 separates the first adhesive-dispensing chamber 14 from the second adhesive-dispensing chamber 16. The second adhesive-dispensing chamber 16 includes a side (circumferential) chamber wall 27 and a bottom chamber wall 29. The chamber walls of the adhesive-dispensing chambers, in some instances, are made of semi-rigid materials, including, but not limited to a polymer, a plastic, a rubber, and so on. In one embodiment, the chamber walls of the adhesive-dispensing chambers are made of a plastic/polymer that is soluble in the actuated adhesive material or in water. Such a plastic/polymer includes, for example, polyvinylalcohol (PVA) or a derivative of PVA. In another embodiment, the chamber walls of the adhesive-dispensing chambers are made of a compressible material. The chamber walls of the adhesive-dispensing chambers, in some instances, are dissolvable, or collapsible or compressible along a y-axis as indicated in FIG. 2A, with the y-axis being defined between the proximal end 11 and the distal end 13 of the fastener-receiving insert 12.

Referring again to FIGS. 2A and 2B, the fastener-receiving insert system 10 further includes a puncturing device, such as the pointed element 18 with a puncturing point 22. While the puncturing device 18 is shown as a conical pointed element, the puncturing device can include any suitable shape that is capable of, upon being urged against a chamber wall, puncturing that chamber wall of the fastener-receiving insert system. In the embodiment illustrated herein, the puncturing device 18 is located at the bottom of and within the adhesive-dispensing chamber 16. In this embodiment, the puncturing device 18 is configured and arranged to puncture the common chamber wall 25 such that the two parts 17, 19 of the adhesive material are introduced to each other and the adhesive material thereby actuated. In other embodiments, the puncturing device 18 is located on or associated with any wall of the adhesive-dispensing chamber 16 or the adhesive-dispensing chamber 14 and configured and arranged to puncture a wall of the respective chamber so as to introduce the two parts 17, 19 of the adhesive material to each other or to release the two parts 17, 19 of the adhesive material between the fastener-receiving insert 12 and the portion of the composite panel 120 defining the insert-receiving orifice 130. In one embodiment, the puncturing device 18 is made of a material similar to that of the chamber walls. In another embodiment, the puncturing device 18 is made of a material of hardness higher than that of the chamber walls. In another embodiment, the puncturing device 18 is dissolvable, collapsible, and/or compressible after puncturing a chamber wall. In another embodiment, the puncturing device 18 includes a flat surface designs to apply pressure to rupture or open a chamber wall in a specific area of the chamber, the specific area of the chamber wall being designed to be ruptured or opened at a specific applied pressure.

When the fastener-receiving insert system 10 is installed in the insert-receiving orifice 130, and urged into the insert-receiving orifice 130 until the proximal end 11 is substantially flush with the exterior surface of the composite panel 120, the puncturing device 18 is, in turn, arranged to puncture a chamber wall of the adhesive-dispensing chamber 14 and/or 16. For example, in one embodiment, the puncturing device 18 is arranged to puncture the common chamber wall 25 between the adhesive-dispensing chambers 14 and 16, causing the first part 17 of the adhesive material in the adhesive-dispensing chamber 14 to mix with the second part 19 of the adhesive material in the adhesive-dispensing chamber 16. The two parts 17, 19 of the adhesive material mix and actuate to form the actuated adhesive material. This actuated adhesive material is dispensed between the fastener-receiving insert 12 and the portion of the composite panel 120 defining the insert-receiving orifice 130 to secure the fastener-receiving insert 12 within the insert-receiving orifice 130.

In one embodiment, the fastener-receiving insert system 10 includes relief openings 24 defined by the proximal end 11 of the fastener-receiving insert 12, with the relief openings 24 being arranged to relieve excess adhesive material from the at least one adhesive-dispensing chamber (14, 16), after the adhesive material is actuated and dispensed to secure the fastener-receiving insert 12 within the insert-receiving orifice 130 defined by the composite panel 120.

In accordance with the foregoing, other aspects of the present disclosure provide a method 300 of forming a fastener-receiving insert system 10 for use with a composite panel 120, as shown for example in FIG. 3, and as indicated in FIGS. 2A-2B and 4A-4B. In such aspects, the method 300 includes at step 310 of disposing at least one adhesive-dispensing chamber (such as the adhesive-dispensing chambers 14 and/or 16) adjacent to a distal end 13 of a fastener-receiving insert 12. The fastener-receiving insert 12 also includes a proximal end 11. The fastener-receiving insert 12 is further adapted to be received in an insert-receiving orifice 130 (FIG. 4B) which is defined by a composite panel 120. The adhesive-dispensing chambers include at least one part of an adhesive material (for example, a first part 17 of an adhesive material and/or a second part 19 of adhesive material) within a chamber wall, such as the chamber walls 21, 23, 25, 27, and 29 shown in FIGS. 2A-2B.

Furthermore, the method 300 includes at step 320 wherein a puncturing device 18 is operably-engaged with at the at least one adhesive-dispensing chamber 14, 16. The puncturing device 18 having a puncturing point 22 is configured to puncture the chamber wall, for example, the common chamber wall 25 between the chambers 14 and 16, to release at least one part of the adhesive material (for example, a first part 17 of an adhesive material and/or a second part 19 of adhesive material) from first adhesive-dispensing chamber 14 and/or the second adhesive-dispensing chamber 16, when the fastener-receiving insert system 10 is installed in the insert receiving orifice 130. As the puncturing device 18 punctures the chamber wall, the first part 17 of the adhesive material and the second part 19 of the adhesive material are mixed and actuated. As further pressure is applied to the fastener-receiving insert system 10 to urge the fastener-receiving insert system 10 into the insert-receiving orifice 130, the chambers 14, 16, and the puncturing device 18 collapse, dissolve or compress, and the actuated adhesive material is dispensed between the fastener-receiving insert 12 and the portion of the composite panel 120 defining the insert-receiving orifice 130 to secure the fastener-receiving insert 12 within the insert-receiving orifice 130. Excess actuated adhesive material dispensed from the adhesive-dispensing chambers is then vented or relieved through a relief opening 24 defined by the proximal end 11 of the fastener-receiving insert 12 (FIG. 2A). The adhesive-dispensing chambers 14 and 16 are designed so as to minimize the amount of excess actuated adhesive material that is dispensed. The volume of the two parts 17, 19 of the adhesive material in the adhesive-dispensing chambers 14, 16 is optimized such that the actuated adhesive material completely secures that fastener-receiving insert 12 within the insert-receiving orifice 130 for structural performance while minimizing the amount of excess actuated adhesive material vented or relieved through the relief opening 24.

Figure 5:
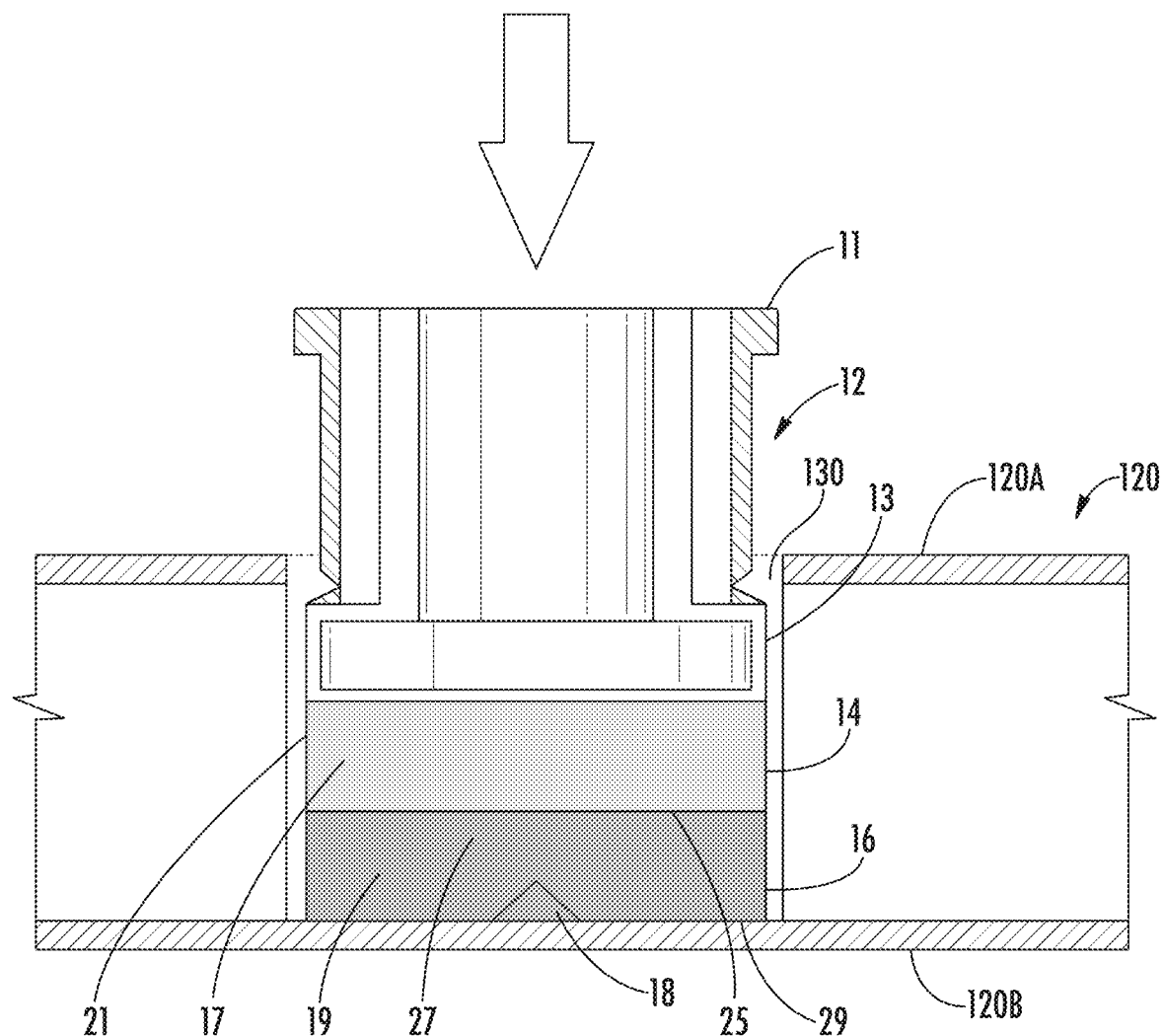

In another aspect, the present disclosure provides a method 900 of installing a fastener-receiving insert system 10 in a composite panel 120, as shown for example in FIG. 9, and as indicated in FIGS. 4A-4B and FIGS. 5-8. As disclosed, it is generally desirable in the fastener-receiving insert installation process for the fastener-receiving insert 12 to be installed such that the proximal end 11 thereof is substantially flush or coplanar with the face sheets of the composite panel, such as an upper face sheet 120A or a lower face sheet 120B, in order to provide optimal interaction with a mechanical fastener or other structure attached to the composite panel and to maintain structural integrity of the assembled end product. In such aspects, the method 900 includes a step 910 of placing a fastener-receiving insert system 10 in an insert-receiving orifice 130 defined by the composite panel 120, as illustrated in FIG. 5. The fastener-receiving insert system 10 includes the fastener-receiving insert 12 which has a proximal end 11 and a distal end 13, the distal end 13 including at least one adhesive-dispensing chamber (14, 16 in FIG. 5). Each of the adhesive-dispensing chambers 14, 16 includes at least one part of the adhesive material within a chamber wall. For example, the first adhesive-dispensing chamber 14 and the second adhesive-dispensing chamber 16 of FIG. 5 respectively include a first part 17 of the adhesive material and a second part 19 of the adhesive material. The fastener-receiving insert system 10 further includes a puncturing device 18 capable of being engaged with a chamber wall, such as the chamber walls 21, 23, 25, 27, 29 shown in FIG. 5. While the puncturing device 18 is engaged with a bottom chamber wall 29 of the second adhesive-dispensing chamber 16, and is arranged and capable of puncturing the common chamber wall 25 between the first adhesive-dispensing chamber 14 and the second adhesive-dispensing chamber 16 in the example embodied in FIG. 5, other arrangements and configurations of the puncturing device can be utilized without departing from the disclosure. For example, the puncturing device 18 is located on or engaged with any wall of the adhesive-dispensing chamber 14 or the adhesive-dispensing chamber 16 and capable of puncturing a wall of the respective chamber so as to introduce the two parts 17, 19 of the adhesive material to each other or to release the two parts 17, 19 of the adhesive material between the fastener-receiving insert 12 and the portion of the composite panel 120 defining the insert-receiving orifice 130.

Figure 6:
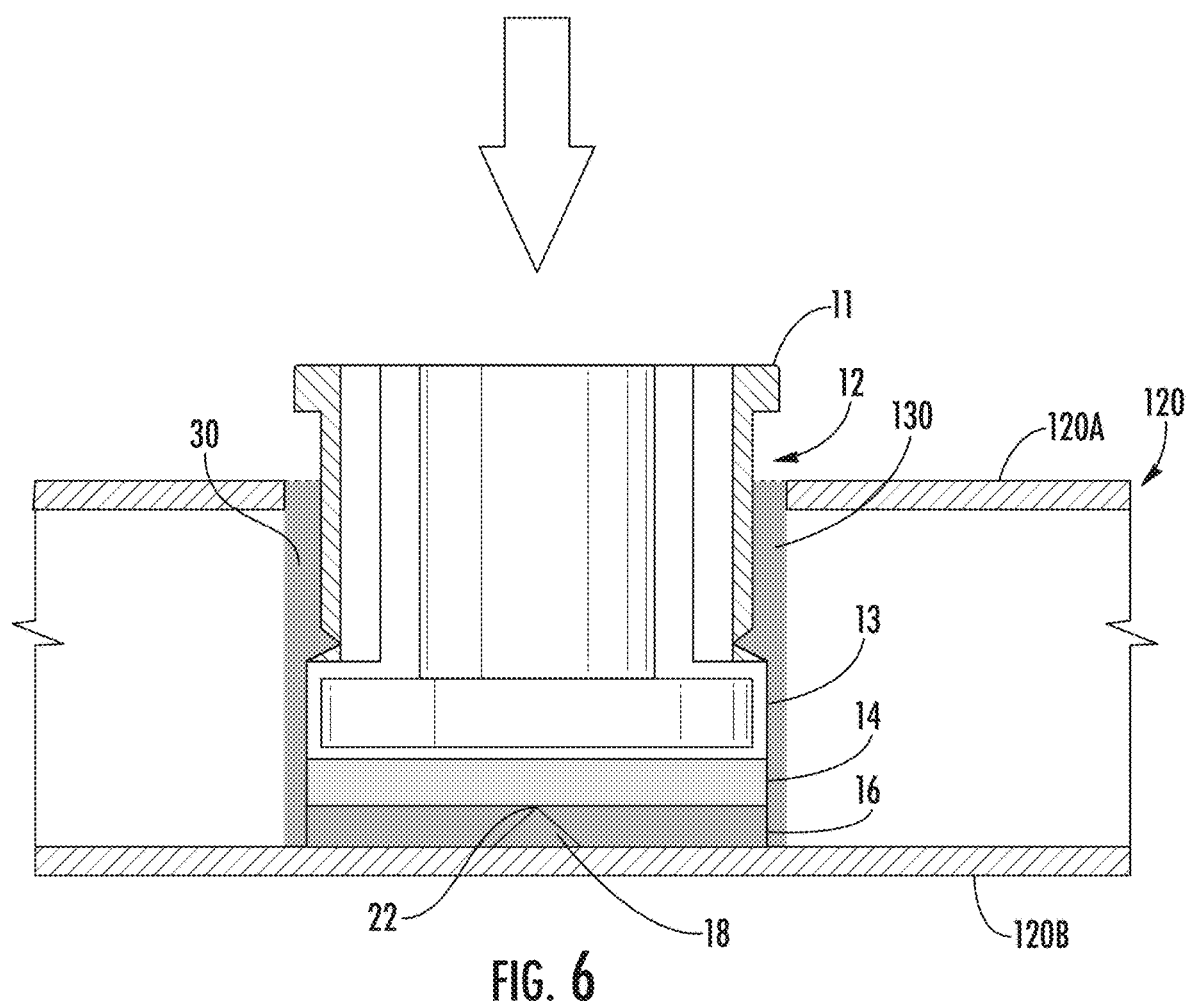
Figure 7:
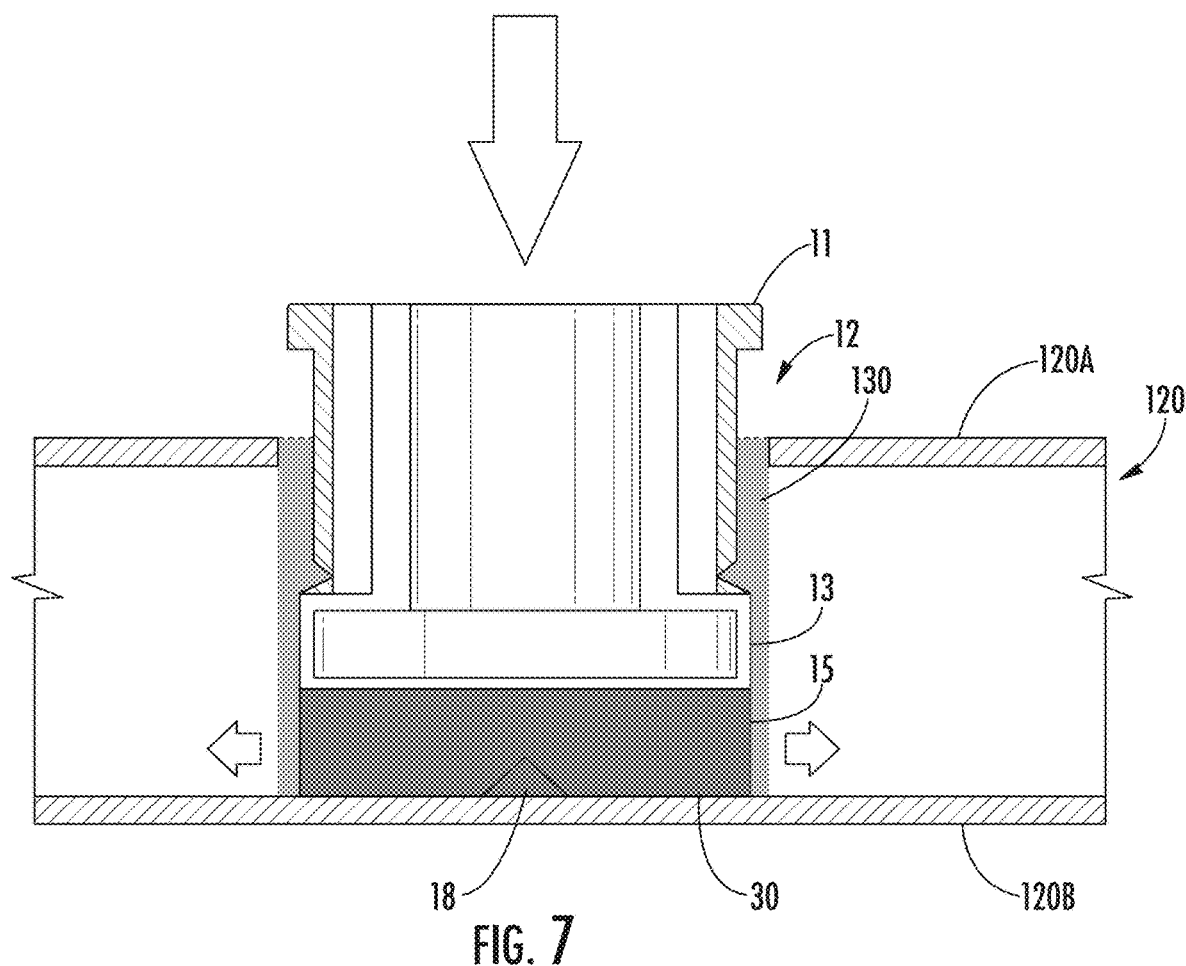
Figure 8:
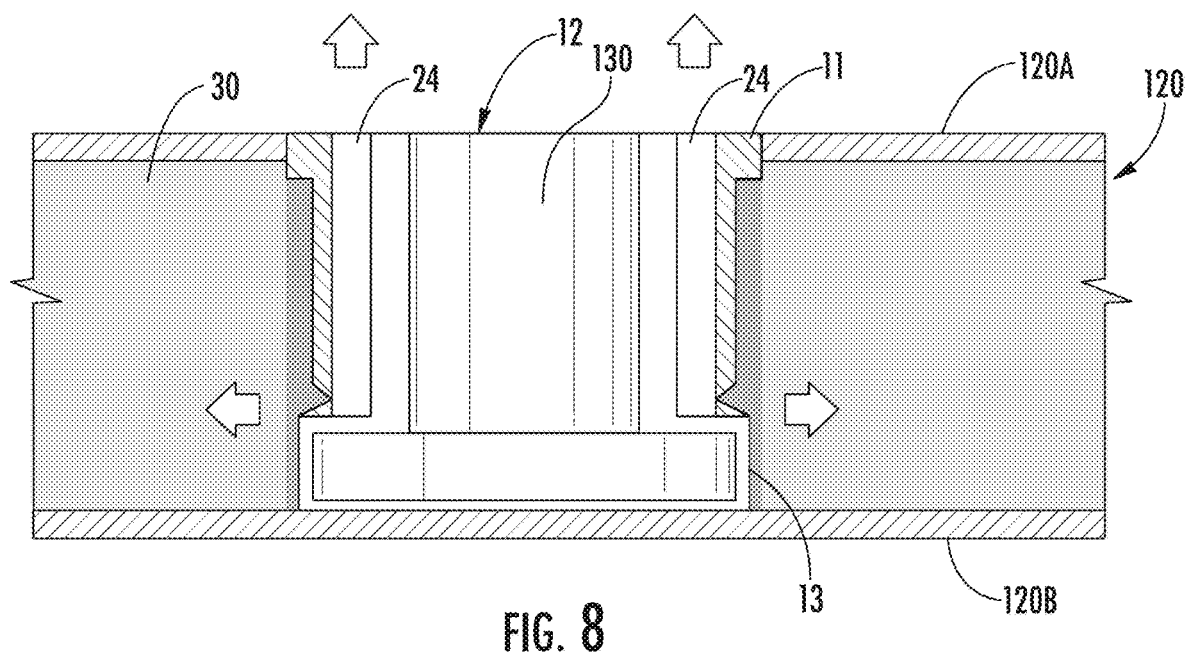

Furthermore, the method 900 includes at step 920 applying pressure to the proximal end 11 of the fastener-receiving insert 12 in the insert-receiving orifice 130 to compress the at least one adhesive-dispensing chamber (14, 16). This illustrated with reference to FIGS. 5 and 6, wherein the arrowhead near the proximal end 11 of the fastener-receiving insert 12 indicates the pressure being applied to the fastener-receiving insert system 10. When pressure is applied to the fastener-receiving insert system 10, the first adhesive-dispensing chamber 14 and the second adhesive-dispensing chamber 16 initially compress, as indicated in FIG. 6, until the proximal end 11 of the fastener-receiving insert 12 is substantially flush or coplanar with an exterior surface of the composite panel 120. The method 900 includes at step 930 puncturing the chamber wall (such as a common chamber wall 25) to release the at least one part of the adhesive material therefrom. Once the puncturing point 22 of the puncturing device 18 punctures the common chamber wall 25, the first part 17 of the adhesive material and the second part 19 of the adhesive material are released from their respective adhesive-dispensing chambers, the two parts 17, 19 of the adhesive material mix and actuate to form the actuated adhesive material 30. The pressure applied to the fastener-receiving insert system 10 further causes a side (circumferential) chamber wall, such as the chamber wall 21 of the first adhesive-dispensing chamber 14 or the chamber wall 27 of the second adhesive-dispensing chamber 16 to collapse or tear causing the actuated adhesive material 30 to be dispersed between the fastener-receiving insert system 10 and the honeycomb structure of the composite panel 120 defining the insert-receiving orifice 130, as illustrated in FIG. 7. In other embodiments, the puncturing device 18 or an additional puncturing device is engaged to puncture one or both of the side (circumferential) chamber walls 21, 27 to allow the actuated adhesive material 30 to be dispersed between the fastener-receiving insert system 10 and the honeycomb structure of the composite panel 120 defining the insert-receiving orifice 130. In other embodiments, the two parts 17, 19 of the adhesive material from the first adhesive-dispensing chamber 14 and the second adhesive-dispensing chamber 16 are initially dispensed between the fastener-receiving insert system 10 and the honeycomb structure of the composite panel 120 defining the insert-receiving orifice 130, whereupon the two parts 17, 19 of the adhesive material mix and actuate to form the actuated adhesive material 30.

As further pressure is applied, the fastener-receiving insert 12 is embedded within the insert-receiving orifice 130 such that the proximal end 11 of the fastener-receiving insert 12 is substantially flush with the upper face sheet 120A of the composite panel 120, and the adhesive-dispensing chambers 14, 16 are completely dissolved, compressed or collapsed. Furthermore, the puncturing device 18 is also completely dissolved, compressed or collapsed, though in some instances, this is not necessary (i.e., the intact puncturing device 18 serves as a spacer to maintain the proximal end 11 substantially flush with the upper face sheet 120A). The actuated adhesive material 30 is dispersed around the fastener-receiving insert 12 and into engagement with the honeycomb structure of the composite panel 120 defining the insert-receiving orifice 130, the fastener-receiving insert 12 is secured within the insert-receiving orifice 130. Excess adhesive material is relieved via relief openings 24 defined by the proximal end 11 of the fastener-receiving insert 12. Once the fastener-receiving insert 12 is in the desired position and orientation inside the insert receiving orifice 130, the actuated adhesive material is allowed to cure and set, thus ensuring a secure fit of the fastener-receiving insert 12 within the composite panel 120.

The present disclosure thus includes, without limitation, the following clauses:

Clause 1: A fastener-receiving insert system, comprising: a fastener-receiving insert having a proximal end and a distal end; at least one adhesive-dispensing chamber adjacent to the distal end of the insert, and containing at least one part of an adhesive material within a chamber wall; and a puncturing device operably engaged with and configured to puncture the chamber wall to release the at least one part of the adhesive material around the fastener-receiving insert.

Clause 2: The fastener-receiving insert system of Clause 1, wherein the fastener-receiving insert is adapted to be received in an insert-receiving orifice defined by a composite panel.

Clause 3: The fastener-receiving insert system of Clause 2, wherein the puncturing device engaged with and configured to puncture the chamber wall is operable to release the at least one part of the adhesive material upon the fastener-receiving insert and the at least one adhesive-dispensing chamber being installed in the insert-receiving orifice, the at least one part of the adhesive material dispensed between the fastener-receiving insert and the composite panel to secure the fastener-receiving insert within the insert-receiving orifice.

Clause 4: The fastener-receiving insert system of Clause 1, wherein the at least one adhesive-dispensing chamber is a single adhesive-dispensing chamber containing the adhesive material.

Clause 5: The fastener-receiving insert system of Clause 1, wherein the at least one adhesive-dispensing chamber comprises a first adhesive-dispensing chamber and a second adhesive-dispensing chamber having a common chamber wall therebetween, the first adhesive-dispensing chamber containing a first part of the adhesive material and the second adhesive-dispensing chamber containing a second part of the adhesive material, the first part and the second part of the adhesive material being configured to actuate the adhesive material upon combination thereof.

Clause 6: The fastener-receiving insert system of Clause 5, wherein the puncturing device is arranged to puncture at least the common chamber wall between the first and second adhesive-dispensing chambers.

Clause 7: The fastener-receiving insert system of Clause 1, wherein the puncturing device is disposed in the at least one adhesive-dispensing chamber.

Clause 8: The fastener-receiving insert system of Clause 1, wherein the chamber wall is dissolvable, collapsible, or compressible along an axis defined by the proximal end and the distal end of the fastener-receiving insert.

Clause 9: The fastener-receiving insert system of Clause 1, wherein the puncturing device is configured as a pointed element with a puncturing point thereof is disposed adjacent to the chamber wall.

Clause 10: The fastener-receiving insert system of Clause 1, wherein the puncturing device is dissolvable, collapsible, or compressible, after puncturing the chamber wall.

Clause 11: The fastener-receiving insert system of Clause 1, wherein the proximal end of the fastener-receiving insert defines a relief opening arranged to relieve excess adhesive material dispensed from the at least one adhesive-dispensing chamber.

Clause 12: A method of forming a fastener-receiving insert system for use with a composite panel, comprising: disposing at least one adhesive-dispensing chamber adjacent to a distal end of a fastener-receiving insert having a proximal end and a distal end, and at least one adhesive-dispensing chamber containing at least one part of an adhesive material within a chamber wall; and operably-engaging a puncturing device with the at least one adhesive-dispensing chamber, the puncturing device being configured to puncture the chamber wall to release the at least one part of the adhesive material around the fastener-receiving insert.

Clause 13: The method of Clause 12, wherein the fastener-receiving insert is adapted to be received in an insert-receiving orifice defined by a composite panel, the puncturing device engaged with and configured to puncture the chamber wall is operable to release the at least one part of the adhesive material upon the fastener-receiving insert and the at least one adhesive-dispensing chamber being installed in the insert-receiving orifice, the at least one part of the adhesive material dispensed between the fastener-receiving insert and the composite panel to secure the fastener-receiving insert within the insert-receiving orifice.

Clause 14: The method of Clause 13, wherein disposing the at least one adhesive-dispensing chamber adjacent to the distal end of the fastener-receiving insert comprises disposing a first adhesive-dispensing chamber adjacent to the distal end of the fastener-receiving insert and a second adhesive-dispensing chamber adjacent to the first adhesive-dispensing chamber, the first adhesive-dispensing chamber and the second adhesive-dispensing chamber having a common chamber wall therebetween, the first adhesive-dispensing chamber containing a first part of the adhesive material and the second adhesive-dispensing chamber containing a second part of the adhesive material, and wherein operably-engaging the puncturing device with the at least one adhesive-dispensing chamber further comprises: operably-engaging the puncturing device with the at least one adhesive-dispensing chamber to puncture at least the common chamber wall between the first and second adhesive-dispensing chambers with the puncturing device, upon the fastener-receiving insert and the at least one adhesive-dispensing chamber being installed in the insert-receiving orifice, to combine the first and second parts of the adhesive material and thereby actuate the adhesive material.

Clause 15: The method of Clause 12, wherein operably-engaging the puncturing device with the at least one adhesive-dispending chamber further comprises: operably-engaging the puncturing device with the at least one adhesive-dispending chamber such that pressure applied to the proximal end of the fastener-receiving insert causes the puncturing device to puncture the chamber wall and to collapse the at least one adhesive-dispensing chamber.

Clause 16: The method of Clause 12, further comprising forming a relief opening in the proximal end of the fastener-receiving insert, the relief opening being adapted to relieve excess adhesive material dispensed from the at least one adhesive-dispensing chamber.

Clause 17: A method of installing a fastener-receiving insert system in a composite panel, comprising: placing a fastener-receiving insert system in an insert-receiving orifice defined by the composite panel, the fastener-receiving insert system comprising a fastener-receiving insert having a proximal end and a distal end, at least one adhesive-dispensing chamber adjacent to the distal end of the fastener-receiving insert, and containing at least one part of an adhesive material within a chamber wall, and a puncturing device operably engaged with the chamber wall; applying pressure to the proximal end of the fastener-receiving insert in the insert-receiving orifice to compress the at least one adhesive-dispensing chamber; and puncturing the chamber wall with the puncturing device to release the at least one part of the adhesive material therefrom and to dispense the at least one part of the adhesive material between the fastener-receiving insert and the composite panel to secure the fastener-receiving insert within the insert-receiving orifice.

Clause 18: The method of Clause 17, wherein the at least one adhesive-dispensing chamber comprises a first adhesive-dispensing chamber and a second adhesive-dispensing chamber having a common chamber wall therebetween, the first adhesive-dispensing chamber containing a first part of the adhesive material and the second adhesive-dispensing chamber containing a second part of the adhesive material, and wherein the method further comprises: puncturing at least the common chamber wall between the first and second adhesive-dispensing chambers with the puncturing device, upon the fastener-receiving insert and the at least one adhesive-dispensing chamber being installed in the insert-receiving orifice, to combine the first and second parts of the adhesive material and thereby actuate the adhesive material.

Clause 19: The method of Clause 14, wherein applying pressure to the proximal end of the fastener-receiving insert in the insert-receiving orifice comprises applying pressure to the proximal end of the fastener-receiving insert in the insert-receiving orifice to cause the puncturing device to puncture the chamber wall and to collapse the at least one adhesive-dispensing chamber.

Clause 20: The method of Clauses 14, wherein the proximal end of the fastener-receiving insert defines a relief opening, and wherein the method further comprises discontinuing the pressure applied to the proximal end of the fastener-receiving insert upon excess adhesive material dispensed from the at least one adhesive-dispensing chamber being relieved through the relief opening.

Many modifications and other embodiments of the inventions set forth herein will come to mind to one skilled in the art to which these disclosed embodiments pertain having the benefit of the teachings presented in the foregoing descriptions and the associated drawings. Therefore, it is to be understood that embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure. In this regard, for example, different combinations of elements and/or functions than those explicitly described above are also contemplated within the scope of the disclosure. Although specific terms are employed herein, they are used in a generic and descriptive sense only and not for purposes of limitation.

It should be understood that although the terms first, second, etc. may be used herein to describe various steps or calculations, these steps or calculations should not be limited by these terms. These terms are only used to distinguish one operation or calculation from another. For example, a first calculation may be termed a second calculation, and, similarly, a second step may be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

That which is claimed:

1. A fastener-receiving insert system, comprising:
   a fastener-receiving insert having a proximal end and a distal end;
   at least one adhesive-dispensing chamber arranged externally to the fastener-receiving insert and in engagement with the distal end thereof, and containing at least one part of an adhesive material within a chamber wall; and
   a puncturing device operably engaged with and arranged to puncture the chamber wall to release the at least one part of the adhesive material therefrom to dispense the at least one part of the adhesive material around the faster-receiving insert.

2. The fastener-receiving insert system of claim 1, wherein the fastener-receiving insert is adapted to be received in an insert-receiving orifice defined by a composite panel.

3. The fastener-receiving insert system of claim 2, wherein the puncturing device engaged with and configured to puncture the chamber wall is operable to release the at least one part of the adhesive material upon the fastener-receiving insert and the at least one adhesive-dispensing chamber being installed in the insert-receiving orifice, the at least one part of the adhesive material dispensed between the fastener-receiving insert and the composite panel to secure the fastener-receiving insert within the insert-receiving orifice.

4. The fastener-receiving insert system of claim 1, wherein the at least one adhesive-dispensing chamber is a single adhesive-dispensing chamber containing the adhesive material.

5. The fastener-receiving insert system of claim 1, wherein the at least one adhesive-dispensing chamber comprises a first adhesive-dispensing chamber and a second adhesive-dispensing chamber having a common chamber wall therebetween, the first adhesive-dispensing chamber containing a first part of the adhesive material and the second adhesive-dispensing chamber containing a second part of the adhesive material, the first part and the second part of the adhesive material being configured to actuate the adhesive material upon combination thereof.

6. The fastener-receiving insert system of claim 5, wherein the puncturing device is arranged to puncture at least the common chamber wall between the first and second adhesive-dispensing chambers.

7. The fastener-receiving insert system of claim 1, wherein the puncturing device is disposed in the at least one adhesive-dispensing chamber.

8. The fastener-receiving insert system of claim 1, wherein the chamber wall is dissolvable, collapsible, or compressible along an axis defined by the proximal end and the distal end of the fastener-receiving insert.

9. The fastener-receiving insert system of claim 1, wherein the puncturing device is configured as a pointed element with a puncturing point thereof disposed adjacent to the chamber wall.

10. The fastener-receiving insert system of claim 1, wherein the puncturing device is dissolvable, collapsible, or compressible, after puncturing the chamber wall.

11. The fastener-receiving insert system of claim 1, wherein the proximal end of the fastener-receiving insert defines a relief opening arranged to relieve excess adhesive material dispensed from the at least one adhesive-dispensing chamber.

12. A method of forming a fastener-receiving insert system, comprising:
   disposing at least one adhesive-dispensing chamber externally to the fastener-receiving insert and in engagement with a distal end thereof, and at least one adhesive-dispensing chamber containing at least one part of an adhesive material within a chamber wall; and
   operably-engaging a puncturing device with the at least one adhesive-dispensing chamber, the puncturing device being arranged to puncture the chamber wall to release the at least one part of the adhesive material around the fastener-receiving insert.

13. The method of claim 12, wherein the fastener-receiving insert is adapted to be received in an insert-receiving orifice defined by a composite panel, the puncturing device engaged with and configured to puncture the chamber wall is operable to release the at least one part of the adhesive material upon the fastener-receiving insert and the at least one adhesive-dispensing chamber being installed in the insert-receiving orifice, the at least one part of the adhesive material dispensed between the fastener-receiving insert and the composite panel to secure the fastener-receiving insert within the insert-receiving orifice.

14. The method of claim 13, wherein disposing the at least one adhesive-dispensing chamber adjacent to the distal end of the fastener-receiving insert comprises disposing a first adhesive-dispensing chamber adjacent to the distal end of the fastener-receiving insert and a second adhesive-dispensing chamber adjacent to the first adhesive-dispensing chamber, the first adhesive-dispensing chamber and the second adhesive-dispensing chamber having a common chamber wall therebetween, the first adhesive-dispensing chamber containing a first part of the adhesive material and the second adhesive-dispensing chamber containing a second part of the adhesive material, and wherein operably-engaging the puncturing device with the at least one adhesive-dispensing chamber further comprises:
   operably-engaging the puncturing device with the at least one adhesive-dispensing chamber to puncture at least the common chamber wall between the first and second adhesive-dispensing chambers with the puncturing device, upon the fastener-receiving insert and the at least one adhesive-dispensing chamber being installed in the insert-receiving orifice, to combine the first and second parts of the adhesive material and thereby actuate the adhesive material.

15. The method of claim 12, wherein operably-engaging the puncturing device with the at least one adhesive-dispending chamber further comprises:

operably-engaging the puncturing device with the at least one adhesive-dispending chamber such that pressure applied to a proximal end of the fastener-receiving insert causes the puncturing device to puncture the chamber wall and to collapse the at least one adhesive-dispensing chamber.

16. The method of claim 12, further comprising:

forming a relief opening in the proximal end of the fastener-receiving insert, the relief opening being adapted to relieve excess adhesive material dispensed from the at least one adhesive-dispensing chamber.

17. A method of installing a fastener-receiving insert system in a composite panel, comprising:

placing a fastener-receiving insert system in an insert-receiving orifice defined by the composite panel, the fastener-receiving insert system comprising a fastener-receiving insert having a proximal end and a distal end, at least one adhesive-dispensing chamber arranged externally to the fastener-receiving insert and in engagement with the distal end thereof, and containing at least one part of an adhesive material within a chamber wall, and a puncturing device operably engaged with the chamber wall and arranged to puncture the chamber wall;

applying pressure to the proximal end of the fastener-receiving insert in the insert-receiving orifice to compress the at least one adhesive-dispensing chamber; and puncturing the chamber wall with the puncturing device to release the at least one part of the adhesive material therefrom and to dispense the at least one part of the adhesive material between the fastener-receiving insert and the composite panel to secure the fastener-receiving insert within the insert-receiving orifice.

18. The method of claim 17, wherein the at least one adhesive-dispensing chamber comprises a first adhesive-dispensing chamber and a second adhesive-dispensing chamber having a common chamber wall therebetween, the first adhesive-dispensing chamber containing a first part of the adhesive material and the second adhesive-dispensing chamber containing a second part of the adhesive material, and wherein the method further comprises:

puncturing at least the common chamber wall between the first and second adhesive-dispensing chambers with the puncturing device, upon the fastener-receiving insert and the at least one adhesive-dispensing chamber being installed in the insert-receiving orifice, to combine the first and second parts of the adhesive material and thereby actuate the adhesive material.

19. The method of claim 17, wherein applying pressure to the proximal end of the fastener-receiving insert in the insert-receiving orifice comprises applying pressure to the proximal end of the fastener-receiving insert in the insert-receiving orifice to cause the puncturing device to puncture the chamber wall and to collapse the at least one adhesive-dispensing chamber.

20. The method of claim 17, wherein the proximal end of the fastener-receiving insert defines a relief opening, and wherein the method further comprises discontinuing the pressure applied to the proximal end of the fastener-receiving insert upon excess adhesive material dispensed from the at least one adhesive-dispensing chamber being relieved through the relief opening.

\* \* \* \* \*